United States Patent [19]

Aikoh et al.

[11] Patent Number: 4,777,515
[45] Date of Patent: Oct. 11, 1988

[54] IMAGE RECORDING APPARATUS

[75] Inventors: Yasuyuki Aikoh, Yokohama; Toshio Iwaya, Shiki; Takashi Naba, Tokyo, all of Japan

[73] Assignee: Canon Kabushiki Kaisha, Tokyo, Japan

[21] Appl. No.: 98,787

[22] Filed: Sep. 21, 1987

[30] Foreign Application Priority Data

Oct. 1, 1986 [JP] Japan .................. 61-233982

[51] Int. Cl.[4] .................. G03B 27/32; G03B 27/52
[52] U.S. Cl. .................. 355/64; 354/109; 355/29; 355/41
[58] Field of Search .................. 355/64, 65, 28, 29, 355/40, 41, 50, 51; 354/105, 109; 352/92

[56] References Cited

U.S. PATENT DOCUMENTS

| | | | |
|---|---|---|---|
| 3,744,899 | 7/1973 | Sable | 355/41 X |
| 3,811,768 | 5/1974 | Zahn et al. | 355/29 |
| 3,981,582 | 9/1976 | Bookless | 355/64 X |
| 4,370,409 | 1/1983 | Bostroem | 355/40 X |
| 4,444,490 | 4/1984 | Stark et al. | 355/64 X |
| 4,607,950 | 8/1986 | Ishii et al. | 355/41 |
| 4,659,213 | 4/1987 | Matsumoto | 355/40 X |
| 4,687,321 | 8/1987 | Itoh | 355/41 |
| 4,693,591 | 9/1987 | Saijo et al. | 355/64 X |
| 4,701,046 | 10/1987 | Shiga | 355/40 X |

Primary Examiner—Richard A. Wintercorn
Attorney, Agent, or Firm—Fitzpatrick, Cella, Harper & Scinto

[57] ABSTRACT

An image recording apparatus records originals of various sizes onto a recording medium. The image recording apparatus includes a detecting device for detecting the size of the original, and an information recording device for recording information representing the size of the original which is detected by the detecting device for each image recorded on the recording medium.

7 Claims, 3 Drawing Sheets

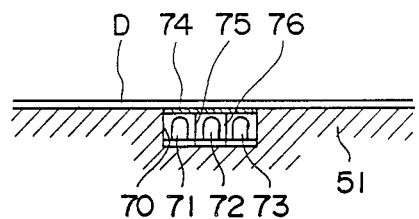
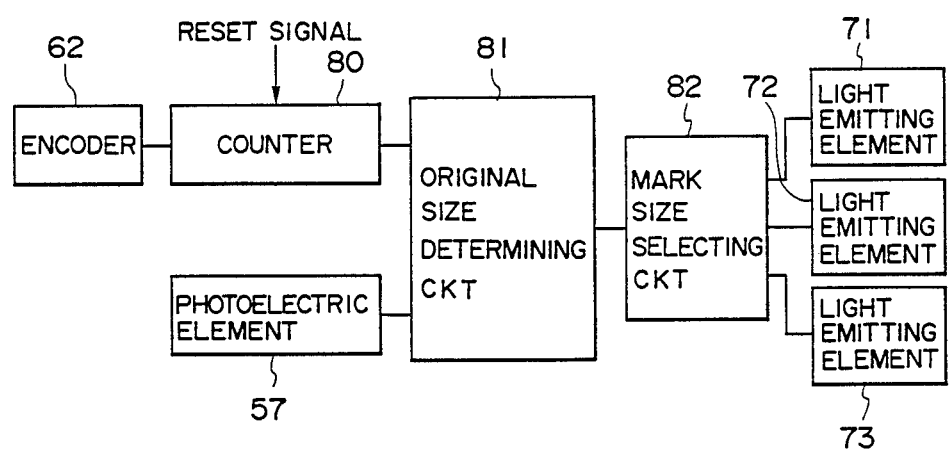
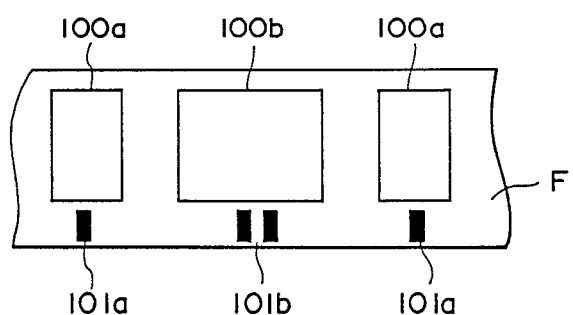

IMAGE RECORDING APPARATUS

BACKGROUND OF THE INVENTION

1. Field of the Invention

The present invention relates to an image recording apparatus for recording an original on a recording medium such as a film.

2. Related Background Art

Image recording apparatuses of this type typically include a microfilm camera for sequentially recording originals such as various types of documents on a reduced scale on a strip of microfilm.

The originals recorded sequentially on one microfilm by the above-described type of camera may be of different sizes. When such originals are photographed, since the known microfilm camera has no means for recording the sizes of the originals, scanning or printing of the film involves the troublesome task of changing the magnification of a scanning device in response to the size of the image borne on the film or of changing the size of printing paper for each size of the image. This reduces scanning or printing efficiency.

SUMMARY OF THE INVENTION

Accordingly, a primary object of the present invention is to provide an image recording apparatus which allows an operator to easily know the size of an original recorded on a recording medium after recording has been performed.

Another object of the present invention is to provide an image recording apparatus which is capable of automatically recording information representing the size of the original while the original is being recorded on the film.

Still another object of the present invention is to provide an image recording apparatus which allows the recording medium bearing the images of the originals to be utilized efficiently in a scanning device or printer.

To achieve the above-described objects, the present invention provides an image recording apparatus for recording an original on a recording medium which comprises original size detecting means for detecting the size of the original, and an information recording means for recording information such as marks which represents the original's size detected by the detecting means on the recording medium for each image borne thereon.

BRIEF DESCRIPTION OF THE DRAWINGS

FIG. 6 is a cross-sectional view of a mark displayer;

FIG. 7 is a block diagram of a control circuit of the camera of FIG. 4; and

FIG. 8 is a plan view of a microfilm, showing a third embodiment of the present invention.

DETAILED DESCRIPTION OF THE PREFERRED EMBODIMENTS

The present invention will be hereinunder described by way of example with reference to the accompanying drawings.

Figure 1:
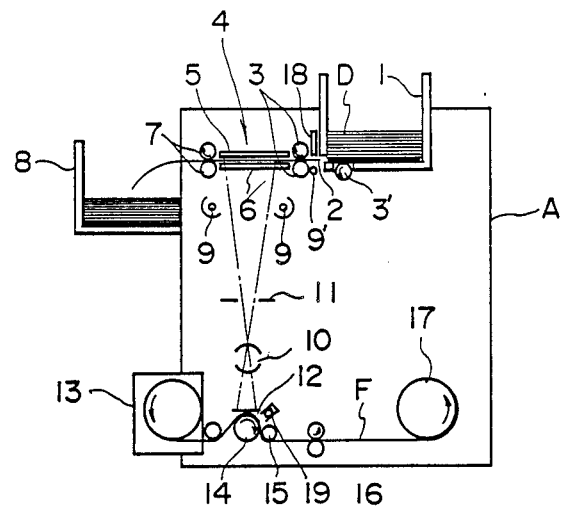
FIG. 1 is a schematic view of a rotary camera, showing a first embodiment of an image recording apparatus according to the present invention.

Referring first to FIG. 1, which shows a rotary microfilm camera 1 to which the present invention is applied, reference numeral 1 indicates an automatic original supply device provided in the upper portion of a camera body A for accommodating a stack of originals D which are in the form of sheet, such as checks, bills, payment slips, drawings, or literature, in such a manner that the image surfaces thereof face downward. The originals at the bottom of the original stack are fed out of the supply device 1 one at a time through an original feed port 2 by a feed roller 3', and each is delivered to a photography position between flat plates of glass 5 and 6 in a photography section 4 by a pair of feed rollers 3 at a fixed speed. Subsequently, each original is discharged to a tray 8 by a pair of discharge rollers 7.

Reference numerals 9 indicate lamps disposed below the photography section 4 for illuminating an original. An image of the original D, which has been illuminated by the lamps 9, is formed on a reduced scale onto a film through a slit 11 by a lens 10. Reference numeral 12 indicates a shutter.

A strip of microfilm F is wound on a supply reel 13. It is fed out from the supply reel 13 by a capstan roller 14 disposed at the position where the image is formed, a pinch roller 15, and a pair of feed rollers 16 at a fixed speed, and is then wound onto a winding reel 17. The capstan roller 14 and the feed rollers 16 are connected to a drive section (not shown) for the original feed rollers 3, so that the microfilm F is fed by the capstan roller 14 and the feed rollers 16 at a speed which is equal to the speed at which the image of the original is fed along the surface of the capstan roller 14, to record the original on a reduced scale onto the microfilm F acting as a recording medium.

Reference numeral 18 indicates a sensor which acts as an original size detecting means and is disposed between the automatic original supply device 1 and the original feed rollers 3. Reference numeral 19 indicates a marking lamp which acts as a mark recording means and is disposed in the vicinity of the capstan roller 14.

Figure 2:
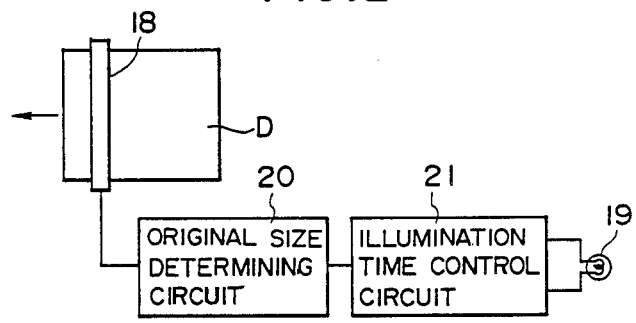
FIG. 2 is block diagram of an essential part of the rotary camera of FIG. 1.

The sensor 18 for detecting the original size comprises a line image sensor including a large number of photocells disposed in the lateral direction across the original, i.e., in the direction perpendicular to the direction in which the original is fed, as shown in FIG. 2. The sensor 18 is adapted to detect the width and length of the original D as it is fed by the feed rollers 3 and 3' to the photography section 5 at a fixed speed. A detection signal from the sensor 18 is sent to an original size determining circuit 20 where the size of the original is determined.

A control circuit 21 shown in FIG. 2 controls the duration of illumination provided by the marking lamp 19 on the basis of the size of the original which is determined by the original size determining circuit 20.

As shown in FIG. 1, a lamp 9' is disposed at the side of the passage along which the original passes at a position at which it faces the sensor 18. The lamp 9' extends in the direction perpendicular to the direction in which the original is fed.

The width of the sensor 18 or the lamp 9' (the length thereof in the direction perpendicular to the direction in which the original is conveyed) is larger than the maximum width of the originals.

While the original D is fed between the sensor 18 and the lamp 9', it blocks the light from the lamp 9', so that no light is received by the photocells of the sensor 18 which are located at positions corresponding to the width of the original. The photocells which have received no light output a logical 1 signal while the photocells which have received light from the lamp 9' output a logical 0 signal. Thus, the width of the original can be obtained by determining the number of photocells which have output the logical 1 signal.

The original size determining circuit 20 determines the width of the original by calculating the length of the sensor from which the logical 1 signals are output. It also determines the length of the original D by measuring the time from when the photocells start to output the logical 1 signal to when they start to output the logical 0 signal. More specifically, it determines the length of the original by measuring the time from when the forward end of the original passes between the sensor 18 and the lamp 9' to when the rear end of the original passes therebetween.

The length of the original may also be determined by measuring the amount by which the original is conveyed while the width of the original is detected by the sensor 18. Thus, the original size determining circuit can determine the size of the original from the width and length thereof.

The illumination control circuit 21 controls the duration of illumination provided by the lamp 19 on the basis of the size of the original which is detected by the original size determining circuit 20.

As shown in FIG. 1, the marking lamp 19 is disposed in the vicinity of the shutter 12. It is lit during a time which has been determined by the control circuit 21 while the original is being photographed, i.e., while the microfilm is being fed, so that a mark having a size representing the original's size is recorded onto the edge of the microfilm for each recorded image of the original.

The marking lamp 19 is surrounded by a light-shielding plate, and a slit-shaped aperture is provided in the portion of the light-shielding plate which faces the film F to pass light therethrough. The time during which the luminous flux of the lamp 19 is irradiated on the film F is changed by varying the time during which the lamp 19 is lit while the film is being fed, so that marks of various sizes can be recorded on the film.

Figure 3:
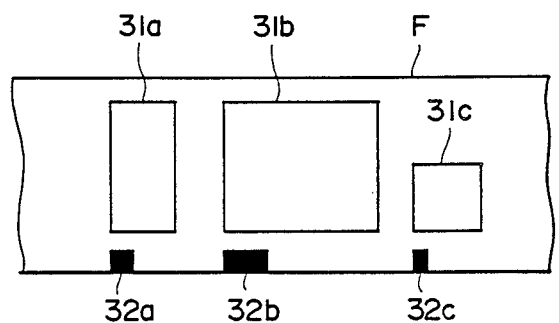
FIG. 3 is a plan view of part of a film recorded by the rotary camera of FIG. 1.

FIG. 3 is a plan view of part of a the microfilm F which bears images of the originals and the marks. Reference numerals 31a to 31c indicate recorded images of originals. Each of the images 31a to 31c has a corresponding mark 32a, 32b, or 32c recorded at the edge of the film. The mark has a length (the dimension thereof in the lengthwise direction of the film) which corresponds to the size of the original.

This embodiment employs a slit-exposure type of image recording apparatus in which the original and the film are fed synchronously as the film is exposed. However, the present invention can be applied to an image recording apparatus of a type in which the original and the film are fixed when the image of the original is recorded onto the film. In that case, the original size detecting sensor 18 and the marking lamp 19 are moved in the lengthwise direction of the film and the original during recording.

In this embodiment, the size of the mark is varied by controlling the time during which the marking lamp 19 is lit. However, it may be varied by providing a shutter between the lamp 19 and the film F, and controlling the aperture or opening time of the shutter while the lamp 19 remains to lit.

Figure 4:
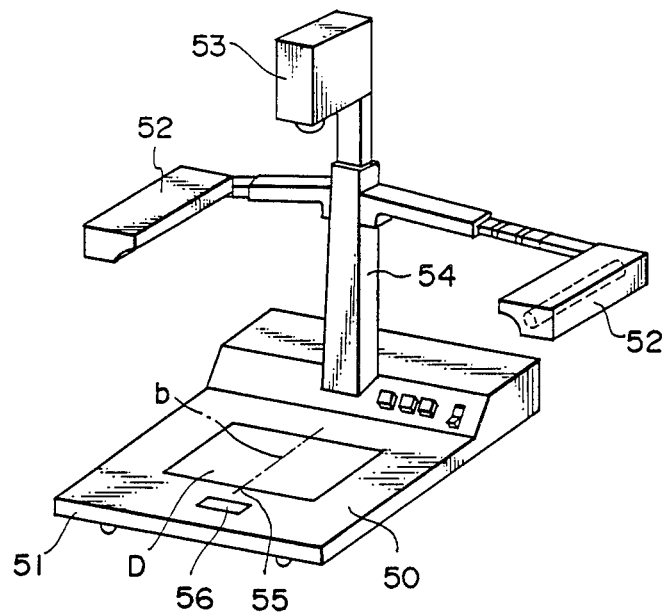
FIG. 4 is a perspective view of a flat bed type camera, showing a second embodiment of the present invention.

FIG. 4 illustrates a flat-bed camera, showing a second embodiment of the present invention. The camera includes an original table 51, lamps 52 for illuminating the original, and a camera 53 with a strip of microfilm contained therein, the lamps 52 and the camera 53 being mounted on a pole 54 fixed on the original table 51.

A surface for placing the original, which is the upper surface of the original table 51, is provided with an indicator 55 that acts as a reference point to be used for positioning the original. The original D is placed on the original surface with a center line b thereof aligned with the indicator 55. The original surface is also provided with a translucent plate 50 on which the original D is placed. A mark displayer 56 is provided on an edge portion of the original surface to display a mark which represents the size of the original image of which is recorded on the film. The mark displayed by the marker 56 is photographed on the microfilm when the original is photographed thereon.

Figure 5:
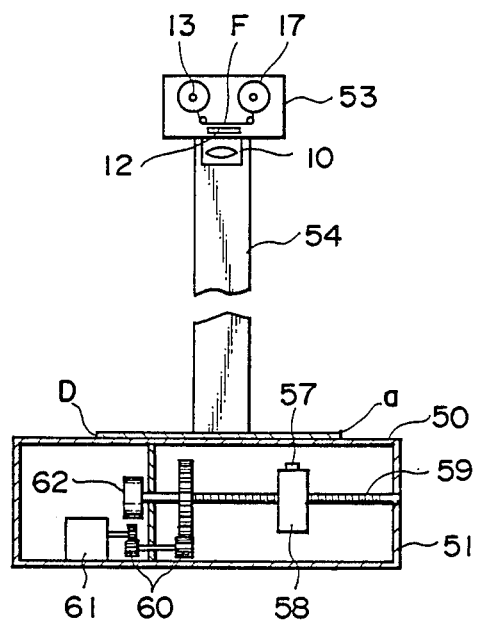
FIG. 5 shows the essential part of the camera of FIG. 4.

FIG. 5 shows an original size detector provided in the camera shown in FIG. 4. The interior of the original table 51 accommodates a movable table 58 with a photoelectric element 57 provided on the upper surface thereof. The movable table 58 is in threaded engagement with a threaded rod 59 which is connected to a motor 61 through a reduction gear train 60. Therefore, the photoelectric element 57 is moved parallel to the original when the motor 61 drives the moving table 58. while the photoelectric element 57 is below the original D, light irradiated from the lamps 52 to illuminate the original is blocked by the original D, so that substantially no light is received by the photoelectric element 57. When the photoelectric element 57 passes one end a of the original D as it moves, light reaches the photoelectric element 57 through the translucent plate 52, increasing the amount of light received by the photoelectric element 57. The photoelectric element 57 detects this variation in the amount of incident light. During this time, the original is placed on the original surface with its center b aligned with the indicator 51.

The threaded rod 59 is connected to an encoder 62 which acts as an original size detecting means. The encoder 62 generates a pulse each time the threaded rod 59 is rotated through a predetermined angle, i.e., it generates a pulse each time the photoelectric element 57 is moved through a predetermined distance.

FIG. 6 shows an example of the mark displayer 56 A recess 70 is provided in the vicinity of the indicator 55 on the original surface to accommodate three light-emitting elements 71 to 73. The recess 70 is covered by a diffusion plate 74. Light-shielding plates 75 and 76 are disposed between adjacent light-emitting elements to divide the recess 70 into three compartments. When light is emitted from one of the light-emitting elements 71 to 73, the resulting mark has a short length. Emission of light from two adjacent light-emitting elements produces a mark having a length twice the first one. When light is emitted from all three light-emitting elements, the length of the resulting mark is three times the first one. Thus, the mark produced on the microfilm has a length which can be made to correspond to the size of the original.

FIG. 7 shows a control circuit for the light-emitting elements. The control circuit includes the encoder 62, and a counter 80 for counting the number of pulses generated by the encoder 62. The counter is reset by a reset signal when the photoelectric element 57 is located at a position at which it is opposite the indicator 51, i.e., at a position which corresponds to the center b of the original D being placed at a predetermined position.

The control circuit also includes an original size determining circuit 81, and a mark size selecting circuit 82 for controlling the emission of light from the light-emitting elements 71 to 73. When the photoelectric element 57 starts moving away from the position which corresponds to the center of the original, the counter 80 starts counting the number of pulses generated by the encoder 62. When it passes the end a of the original, it starts receiving light, and outputs an original end detection signal. The original size determining circuit 81 reads the count of the counter 80 at the time at which it receives the original end detection signal, to determine the size of the original.

The original size determining circuit 81 contains a list of counts which correspond to different original sizes, and determines the size of the original which corresponds to the read counts from this list. It then delivers the signal representing the thusdetermined original size to the mark size selecting circuit 82.

The mark size selecting circuit 82 selectively turns on the light-emitting elements 71 to 73 to correspond to the detected original size. If three different original sizes are to be detected, for example, the mark size selecting circuit 82 turns on the light-emitting element 72 when an original of the smallest size is detected. It turns on the light-emitting elements 71 and 72 when a medium-sized original is detected, and all the light-emitting elements 71 to 73 when an original of the largest size is detected. If originals of more than three different sizes are employed, the number of light emitting element is increased accordingly.

In this embodiment, the length of the mark in the lengthwise direction of the film is varied in response to the size of the original. However, the number of marks may be changed in place of the length thereof to correspond to the size of the original. Alternatively, the length of the mark in the crosswise direction of the film may be changed.

To indicate the different sizes of the originals, the number of recorded marks can be changed as follows: when an original of a first size is detected, the light-emitting element 71 shown in FIG. 6 is turned on, and, when an original of a second size is detected, the light-emitting elements 71 and 73 are turned on.

FIG. 8 shows a microfilm with marks provided by the latter method. Reference numeral 100a indicates a recorded image of an original having a first size. 100b indicates a recorded image on an original of a second size. 101a and 101b indicate marks provided for each image. The number of marks which constitute the mark 101a or 101b is changed by the detected size of the original.

The different sizes of the originals may also be indicated by changing the shape, position, density, or color of the mark.

The mark having a density which corresponds to the size of the original may be recorded by changing the luminance of the marking lamp in response to the size of the original.

Information such as symbols and codes which represents the size of the original may be displayed by the mark displayer to be photographed.

As will be understood from the foregoing description, a mark representing the size of the original can be recorded on the recording medium together with the original, according to the present invention. It is therefore possible to reproduce the image by a scanning device in a magnification which ensures that the reproduced image has the size corresponding to that of the original by identifying the recorded mark, or, to supply information on the size of the original to a printer to enable the size of the printing paper to be automatically selected. This can increase scanning and/or printing efficiency.

We claim:

1. An image recording apparatus comprising:
   recording means for recording the image of an original onto a recording medium;
   detecting means for detecting the size of said original; and
   information recording means for recording information characteristic of and corresponding to said size of said original which is detected by said detecting means for each image recorded on said recording medium.

2. An image recording apparatus according to claim 1, wherein said detecting means includes photocells for scanning said original.

3. An image recording apparatus according to claim 1, wherein said detecting means includes a line image sensor.

4. An image recording apparatus according to claim 1, wherein said information recording means records a mark of a shape which corresponds to said size of said original.

5. An image recording apparatus according to claim 1, wherein said information recording means records a mark of a size which corresponds to said size of said original.

6. An image recording apparatus according to claim 1, wherein said information is recorded at a side of said image recorded on said recording medium.

7. A microfilm camera comprising:
   detecting means for detecting the size of an original;
   display means for displaying information to be used to judge said size of said original;
   display control means for controlling said information displayed by said display means on the basis of said size of said original which is detected by said detecting means; and
   recording means for recording said original and said displayed information onto a strip of microfilm.

* * * * *

UNITED STATES PATENT AND TRADEMARK OFFICE
CERTIFICATE OF CORRECTION

PATENT NO. : 4,777,515

DATED : October 11, 1988

INVENTOR(S) : Yasuyuki Aikoh, et al.

It is certified that error appears in the above-identified patent and that said Letters Patent is hereby corrected as shown below:

COLUMN 1

Line 60, "flat bed" should read --flat-bed--.

COLUMN 2

Line 12, "sheet," should read --sheets,--.

COLUMN 3

Line 51, 2nd occurrence of "a" should be deleted.

COLUMN 4

Line 6, "to" should be deleted;

Line 35, "while" should read --While--; and

Line 53, "56A" should read --56. A--.

UNITED STATES PATENT AND TRADEMARK OFFICE
CERTIFICATE OF CORRECTION

PATENT NO. : 4,777,515

DATED : October 11, 1988

INVENTOR(S) : Yasuyuki Aikoh, et al.

It is certified that error appears in the above-identified patent and that said Letters Patent is hereby corrected as shown below:

COLUMN 5

Line 27, "thusdetermined" should read

--thus determined--; and

Line 39, "element" should read --elements--.

Signed and Sealed this

Eighteenth Day of July, 1989

Attest:

DONALD J. QUIGG

Attesting Officer

Commissioner of Patents and Trademarks